Patented Jan. 4, 1949

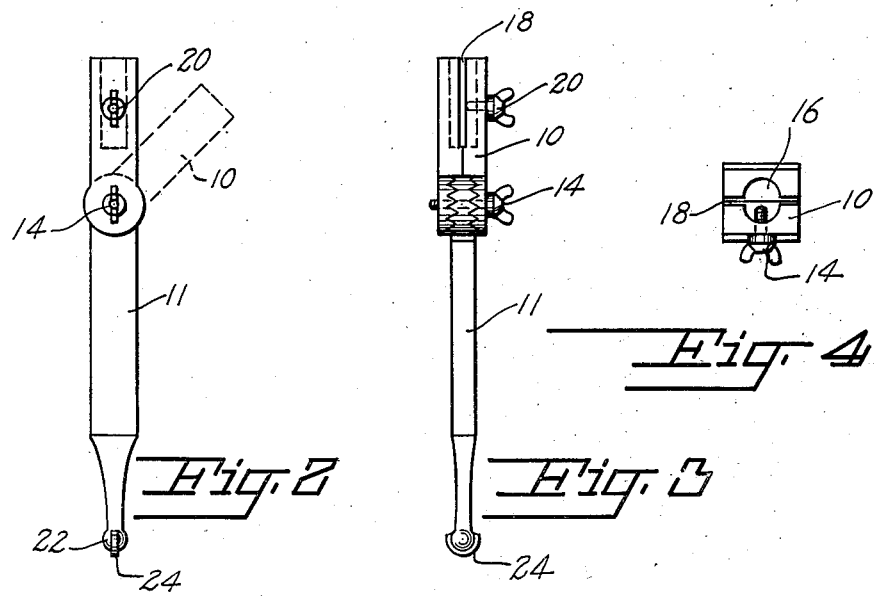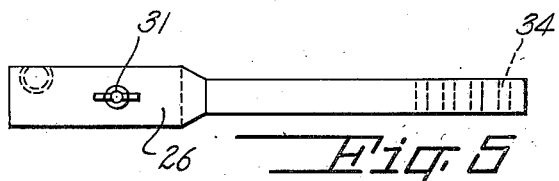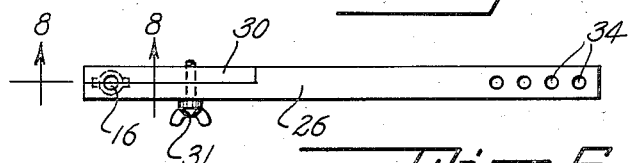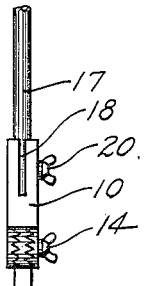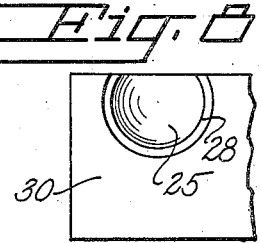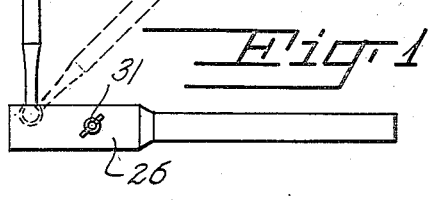

2,458,235

UNITED STATES PATENT OFFICE 2,458,235

UMBRELLA HOLDER

Joe I. Williams, Sterling City, Tex.

Application August 12, 1947, Serial No. 768,183

2 Claims. (Cl. 248—42)

This invention relates to a holder for umbrellas.

It is a principal object of the invention to provide an adjustable holder for an umbrella. The holder itself may be attached to a stationary support or to a tractor or other vehicle. The holder is so designed that the umbrella may be adjusted in any position desired to shield the user from rain or sun. Also, if desired, the holder may be folded flat against the ground or the vehicle.

A preferred embodiment of the invention is illustrated in the accompanying drawing, but it is understood that modifications may be made without departing from the spirit of the invention as hereinafter claimed.

Figure 1 represents a front elevation of the new and improved holder.

Figure 2 is a side elevation of the holder, on a different scale.

Figure 3 is a front elevation of the holder shown in Figure 2.

Figure 4 is a plan view of the structure shown in Figure 2.

Figure 5 is a front elevation of a support to which the umbrella holder may be attached.

Figure 6 is a plan view of the support shown in Figure 5.

Figure 7 is a front elevation, on an enlarged scale, of the lower extremity of the umbrella holder.

Figure 8 is a front elevation, on an enlarged scale, of a portion of the support shown in Figures 5 and 6, into which the lower extremity of the holder may be inserted, along the line 8—8 of Figure 6.

The holder comprises a sleeve 10 and a shank 11. The sleeve 10 is bifurcated at its lower portion, and the furcations embrace the upper extremity of the shank 11. The contacting edges of the furcations of the sleeve 10 and the upper portion of the shank 11 are serrated, as shown in Figure 3, and a wing nut 14 passes through aligned apertures in the furcations of the sleeve 10 and the upper portion of the shank 11 to serve as a pivot. It will be seen, therefore, that the sleeve 10 may be positioned angularly with respect to the shank 11, as indicated in Figure 2 of the drawings, the frictional engagement between the two members being regulated by the wing nut 14.

The upper portion of the sleeve 10 is centrally apertured at 16 to receive the stem 17 of an umbrella. The upper portion of the sleeve 10 has one or more longitudinally extending slots 18 to permit the sleeve 10 to open for the reception of different sizes of stem 17, and a wing nut 20 is provided for the purpose of holding the stem 17 in place in the sleeve 10.

The lower extremity of the shank 11 terminates in a ball 22, and the ball 22 is formed with an annular ear 24, as indicated in Figure 6 of the drawings. The ball 22 is adapted to be accommodated within a spherical chamber 25 in an arm 26. The spherical chamber 25 in the arm 26 is provided with a vertically extending annular recess 28 to accommodate the ear 24 on the ball 22. Consequently, the shank 11 may pivot vertically with respect to the arm 26, about the center of the ball 22 as a pivot.

The ear 24 on the ball 22 will travel in the recess 28 of the sperical chamber 25 in the arm 26. One wall of the spherical chamber 25 and annular recess 28 may be formed by a bracket 30, which may be removably fastened to the arm 26 by means of a wing nut 31. The wing nut 31, of course, will control the frictional engagement between the ball 22 and its spherical recess 25, and thereby permit regulation of the movement of the shank 11 with respect to the arm 26.

One end of the arm 26 may contain a plurality of holes 34 by which it may be fastened to a wagon or other vehicle or to a stationary support.

In the operation of the device, the stem 17 of the umbrella is inserted within the aperture 16 of the sleeve 10, and fastened therein by means of the wing nut 20. The umbrella may then be swung in one plane or the other to the desired position, and fastened therein by means of the wing nuts 14 and 31. Of course, these wing nuts 14 and 31 may be already tightened to such an extent that the umbrella may be swung to any position and be retained there frictionally. If the holder is not to be used, it may be swung about the axis of the ball 22 until it lies flat against the arm 26, or the wing nut 31 may be loosened and the bracket 30 removed therefrom, together with the shank 11 and sleeve 10. With this arrangement, the device may be easily mounted on a vehicle or removed therefrom, and when used will provide desired shelter with a minimum of effort.

What is claimed is:

1. A device of the character described, comprising a sleeve, said sleeve being centrally apertured to receive the stem of an umbrella, the said sleeve being slotted to accommodate different sizes of stems, adjustable means for securing the stem in the sleeve, a shank, said sleeve being bifurcated to receive the upper extremity of the shank, a pivot pin passed through the upper portion of the shank and the furcations of the sleeve, means for adjustably controlling the friction between the contacting portions of the sleeve and the shank, a ball tip at the lower extremity of the shank, said ball being provided with an annular ear at right angle to the path of pivoting of the sleeve with respect to the shank, an arm adapted to receive the ball and the ear to permit movement between the shank and the arm, and means for controlling the frictional engagement of the shank and the arm.

2. A device of the character described, comprising a sleeve, said sleeve being centrally apertured to receive the stem of an umbrella, adjustable means for securing the stem in said sleeve, a shank, means pivotally connecting said sleeve to the upper extremity of said shank, means for releasably locking said sleeve to said shank in a pivotally adjusted position relative thereto, a ball tip at the lower extremity of said shank, said ball tip being provided with an annular ear at right angles to the path of pivoting of the sleeve relative to said shank, an arm adapted to receive said ball tip and said ear to permit pivotal adjusting movement between the shank and arm, and means for releasably locking said shank in a pivotally adjusted position relative to said arm.

JOE I. WILLIAMS.

REFERENCES CITED

The following references are of record in the file of this patent:

UNITED STATES PATENTS

| Number | Name | Date |
|---|---|---|
| Re. 3,792 | Hermance | Jan. 11, 1870 |
| 159,795 | Clarke | Feb. 16, 1875 |
| 488,549 | Dugan | Dec. 27, 1892 |